United States Patent [19]

Nakahara et al.

[11] 4,332,516

[45] Jun. 1, 1982

[54] METHOD AND APPARATUS FOR THROWING DOWN CONCRETE

[75] Inventors: Yasushi Nakahara, Hachioji; Tadasuke Ohtomo, Hino; Masahiro Yurugi; Takumi Naitoh, both of Tokyo; Kenichi Kaiho, Hino, all of Japan

[73] Assignee: Kajima Corporation, Tokyo, Japan

[21] Appl. No.: 143,133

[22] Filed: Apr. 23, 1980

[30] Foreign Application Priority Data

Nov. 5, 1979 [JP] Japan .................. 54-142911

[51] Int. Cl.$^3$ .................. B65G 11/10; B65G 11/20; B65G 65/40
[52] U.S. Cl. .................. 414/288; 193/25 S; 193/32; 222/544
[58] Field of Search .................. 414/217, 288, 299; 222/213, 214, 544, 450; 193/25 R, 25 S, 32; 137/205; 417/900

[56] References Cited

U.S. PATENT DOCUMENTS

| | | | |
|---|---|---|---|
| 2,906,417 | 9/1959 | Rossi | 414/217 X |
| 3,249,192 | 5/1966 | Buskirk | 193/25 R X |
| 3,365,240 | 1/1968 | Gordon | 222/450 X |
| 3,568,733 | 3/1971 | Lau | 222/214 X |
| 3,746,140 | 7/1973 | Schiffelbein | 193/10 X |

*Primary Examiner*—James L. Rowland
*Attorney, Agent, or Firm*—Oblon, Fisher, Spivak, McClelland & Maier

[57] ABSTRACT

The disclosed method and apparatus for the downward transfer of concrete eliminate separation of concrete ingredients and drop impact of concrete during concrete placing across a high head, by intermittently feeding concrete to an air-tight chute from the top end thereof while normally keeping the chute top end closed airtightly, the chute having at least one flexible portion adapted to be collapsible upon removal of concrete thereform.

10 Claims, 5 Drawing Figures

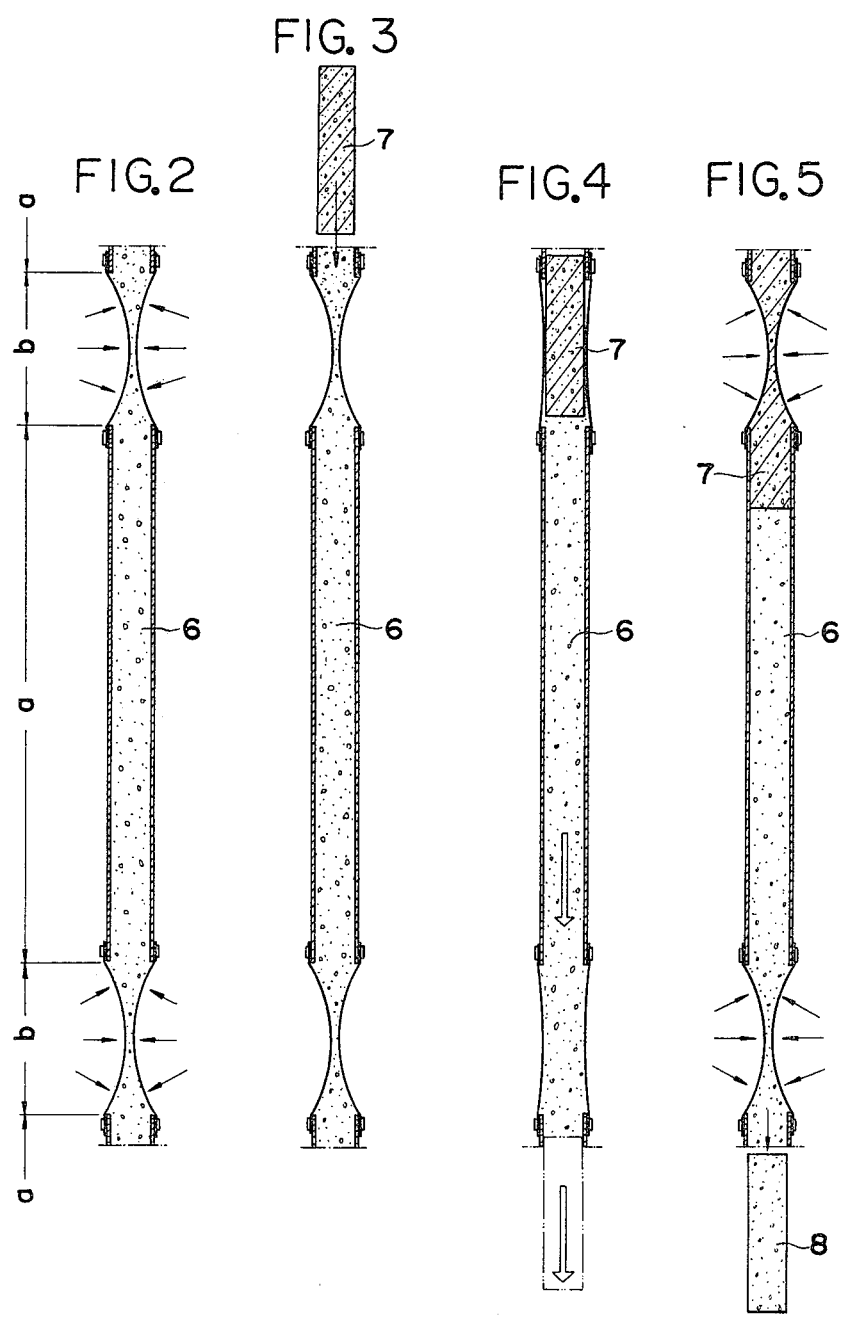

METHOD AND APPARATUS FOR THROWING DOWN CONCRETE

BACKGROUND OF THE INVENTION

1. Field of the Invention

This invention relates to a method and an apparatus for the downward transfer of concrete, which method and apparatus are particularly suitable for placing concrete or mortar across a high head at an angle relative to a vertical.

2. Description of the Prior Art

It is often necessary to downwardly transfer concrete vertically or with an inclination to the vertical in constructing various structures, such as vertical or inclined shafts of tunnels, underground power plants, vertical or inclined surfaces of building foundations, and dams. The recent trend is to build large structures deep in the ground, and the head and inclination for the downward transfer of concrete are increasing.

Heretofore, to downwardly transfer concrete through a path with or without an inclination, buckets, chutes, and concrete pumps are used depending on the scale and site conditions of the construction. A typical bucket system of the prior art is a concrete conveyor having a bucket driven by a winch, in which the bucket has wheels so as to move up and down along rails mounted on the inclined surface or in the shaft. The concrete pumps of the prior art are suitable only for the cases with a small angle relative to a horizontal.

The concrete downwardly transfered by buckets has shortcomings in that a continuous supply of the concrete is impossible and that if the head is high the vertical travel of the buckets takes time, so that efficiency of the work is low. Besides, when a worker is stationed at the place where concrete is deposited by the bucket, he is exposed to the risk of being hit by concrete particles or blocks which separate from the bucket moving above him and drop downward.

Open chutes and steel pipe chutes have been used for downwardly transfer of concrete. Such chutes, however, have shortcomings in that aggregates and mortar ingredients of the concrete tend to be separated as the concrete moves downward and that, when the head is high and the inclination relative to a horizontal is large, the velocity of the concrete at the outlet end of the chute becomes so high that a considerably large impact is applied to the place where the concrete drops and the high speed collision of the concrete there tends to increase the separation of the concrete ingredients, causing adverse effects on the quality of the concrete placed, on protection of reinforcing steel members and members to be buried at the place of concrete placing, and on the safety of the workers.

SUMMARY OF THE INVENTION

Therefore, an object of the present invention is to obviate the aforesaid shortcomings of the conventional methods and apparatus by providing an improved method and apparatus for the downward transfer of concrete. In the method according to the present invention, an airtight chute having fixed rigid pipes and at least one flexible collapsible tube connected between adjacent rigid pipes is extended downward from a feeding level at the top of a high head to a discharge level near the bottom of the head, and concrete material is intermittently fed downward to the top end of the chute while normally keeping the chute top closed airtightly.

The concrete material thus intermittently fed to the chute drops comparatively slowly while expanding the flexible portion of the chute, so that no separation of the ingredients of the concrete occurs. Here, "concrete material" means various cement-containing mixtures to be placed on earth or structure surfaces, such as mortar, cement milk, concrete mixture, and the like.

An apparatus for the downward transfer of concrete according to the present invention includes a chute extending downward from a feeding level at the top of a high head to a discharge level at the bottom of the head, a hopper airtightly connected to the top end of the chute, and a valve for selectively interrupting communication between the hopper and the chute, the chute having fixed rigid pipes and at least one flexible collapsible tube connected between the adjacent rigid pipes, the flexible tube adapted to flatten or contract upon removal of concrete therefrom.

In a preferred embodiment of the invention, the chute extends downward with an angle relative to a vertical and has a plurality of steel pipes connected in series with flexible tubes inserted between adjacent steel pipes.

In another embodiment of the present invention, the chute includes of alternately connected steel pipes with ring-shaped couplers secured to opposite ends of each pipe and flexible tubes with ring-shaped couplers secured to opposite ends of each tube, the couplers of the steel pipe being airtightly connectible to the couplers of the flexible tube.

The flexible portion of the chute in the apparatus according to the present invention is preferably made of airtight flexible materials, such as rubber or synthetic resin of a suitable kind.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 2 through FIG. 5 are diagrammatic illustrations of the manner in which concrete is downwardly transfered through the apparatus of FIG. 1.

DETAILED DESCRIPTION OF THE PREFERRED EMBODIMENTS

Figure 1:
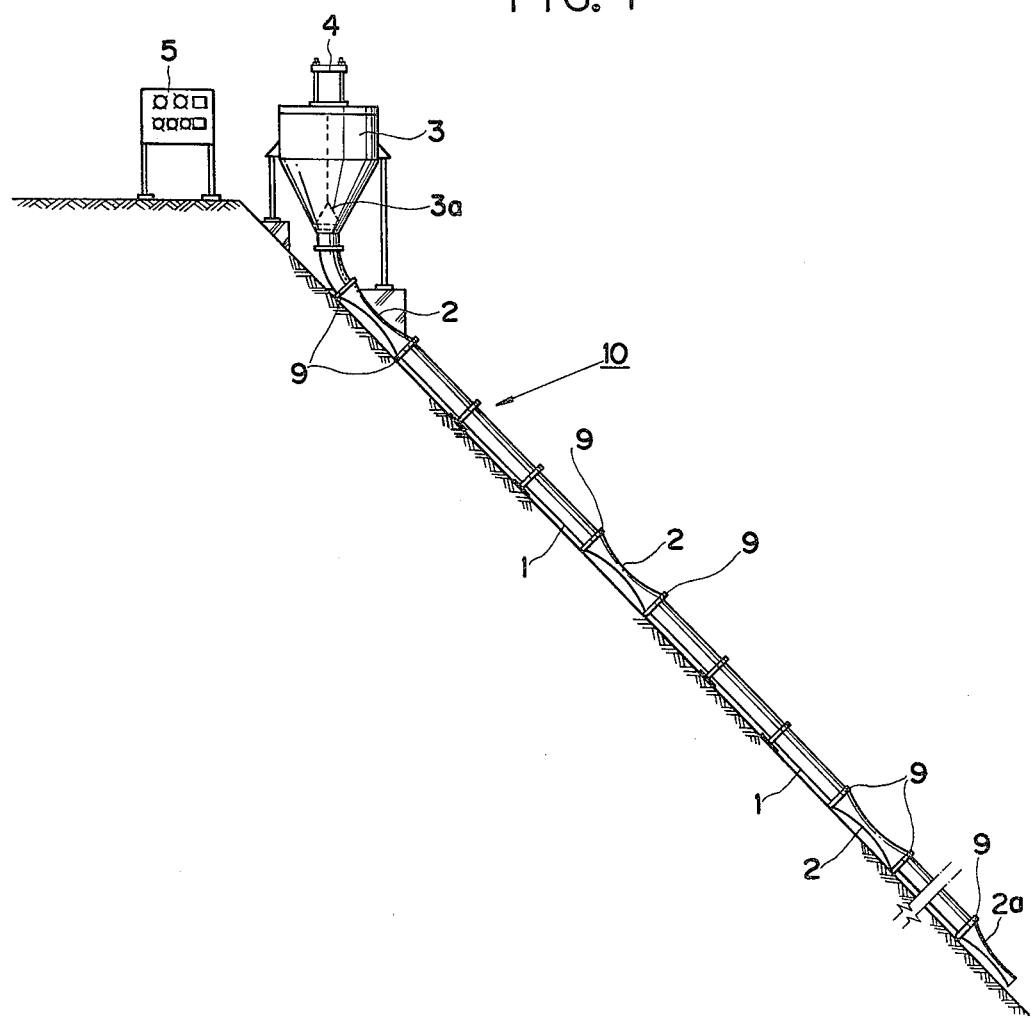
FIG. 1 is a schematic side view of an apparatus according to the present invention.

Referring to FIG. 1, an apparatus 10 for the downward transfer of concrete according to the present invention generally includes a top device and a chute extending downward from the top device. The chute of this embodiment has a plurality of steel pipes 1, or like rigid pipes, and flexible tubes 2 connected between adjacent steel pipes. The entire walls and joint portions of the chute are made airtight. In the embodiment of FIG. 1, the chute is fixed to the inclined surface of the earth by suitable conventional mechanism.

The top device is a hopper 3 having a valve 3a and an air cylinder 4 for actuating the valve 3a. The hopper 3 is adapted to intermittently feed the concrete material to the chute in discrete portions with preset time intervals between one feeding and the next feeding. The hopper 3 is also adapted to prevent air from entering into the chute after the feed of the concrete material toward the chute. In the illustrated embodiment, the feeding of the concrete material from the hopper 3 can be controlled from a control panel 5, which panel can be located by the hopper 3 or remotely from the hopper 3. The air cylinder 4 may be replaced with any other suitable valve actuating mechanism, e.g., a hydraulic cylinder or an electromagnetic valve actuating mechanism.

The top end of the chute is airtightly connected to outlet end of the hopper 3. Each of the steel pipes 1 and the flexible tubes 2 has ring-shaped couplers 9 at opposite ends thereof, so that the pipes 1 and the tubes 2 can be alternately connected in an airtight manner. The connection between the adjacent steel pipe and the flexible tube is not restricted to such ring-shaped couplers, but any other coupling mechanism which provides stable airtight connection therebetween, e.g., flanges with bolts and nuts or suitable fastening straps, can be used in the apparatus of the invention.

The flexible tube 2, for instance, is made of rubber or a suitable synthetic resin. Referring to FIG. 2, if the length of one steel pipe 1 is represented by a and the length of one flexible tube 2 is represented by b, a preferable ratio of the total length of the steel pipes 1 given by the total sum of a to the total length of the flexible tubes 2 given by the total sum of b is from 20:1 to 3:1. Thus, the total length of the steel pipes 1 is preferably longer than that of the flexible tubes 2. A lower end tube 2a (FIG. 1) connected to the lower end of the chute is also flexible.

The method of downwardly transfering concrete according to the present invention and its principles will be now explained by referring to the apparatus of the aforesaid construction. The concrete material is discharged into the hopper 3, for instance, from a truck agitator (not shown), and the concrete material in the hopper 3 is intermittently fed into the chute in portions by opening and closing the valve 3a between the hopper 3 and the chute.

The first portion of the concrete material fed into the chute in starting the downward transfer operation fulfills the following two functions as it slides down through the chute; namely, to push the air filling the inside of the chute down and exhaust that air through the outlet opening of the lower end tube, and to generate a negative pressure in the chute after passage of the first portion of the concrete material.

Due to the airtight construction of the hopper 3 and the chute, the aforesaid functions of the downwardly sliding portion of the concrete material is amplified as ensuing intermittent feeding of the concrete portions takes place. As a result, the inside of the airtight chute is filled with concrete material 6, which replaces the air that previously filled the chute, as shown in FIG. 2. Thus, a comparatively high negative pressure is generated in the chute.

Under such conditions, each flexible tube 2 connected between adjacent steel pipes 1 is flattened while holding the concrete material therein, by the actions of the negative pressure generated in the chute and the atmospheric pressure acting on the outer surface of the tube 2. Accordingly, the concrete material filling the adjacent steel pipes 1 is substantially separated by the thus flattened flexible tube 2, as shown in FIG. 2. Consequently, the individual steel pipes 1 which form a large part of the chute are substantially blocked by the flattening or contraction of the flexible tubes 2 inserted between the adjacent steel pipes 1, whereby the steel pipes 1 are rendered to hold the concrete material therein.

Since the entire apparatus 10 is airtight, the concrete material 6 in the chute thus interrupted by the flexible tubes 2 tends to stay in the chute unless the airtightness is released in whole or in part, as shown in FIG. 3. The aforesaid tendency of holding the concrete material 6 in the chute depends on the airtightness of the apparatus. As soon as the airtightness is broken at the top of the chute, the balance of forces for holding the concrete material 6 in the chute is broken, and the concrete material 6 moves downward.

Referring to FIG. 3, as a mechanism for breaking the airtightness at the top of the chute, an incoming concrete portion 7 is delivered into the chute without allowing any air to enter the chute. As soon as the delivery of the incoming concrete portion 7 to the chute is stopped, the airtightness of the chute is resumed and the concrete material 6 in the chute ceases to slide downward.

The actions of the flexible tubes 2 which flatten as the concrete material 6 in the chute moves down can be summarized as follows.

(a) For that steel pipe 1 which is connected to the lower end of each flexible tube 2, the tube 2 acts as a valve for producing the airtightness at the top of that steel pipe 1 so as to hold the concrete material 6 in that steel pipe 1.

(b) For that steel pipe 1 which is connected to the upper end of each flexible tube 2, the tube 2 acts as a valve for preventing any replacement of the concrete material 6 in that steel pipe 1 above the tube 2 by residual air in the steel pipe 1 below the tube 2 referred to in the preceding paragraph (a).

In short, the flexible tubes 2 act as valves between adjacent steel pipes 1 forming a large portion of the chute, for temporarily holding the flow of the concrete material 6 in the chute by using the negative pressure generated in the chute by the concrete flow itself, whereby the concrete 6 can be held in the steel tubes 1.

In the chute with such functions and having the steel pipes 1 alternately connected to the flexible tubes 2, each steel pipe 1 acts to transmit only that volume of the concrete material which corresponds to the volume of the concrete portion flowing down through the flexible tube 2 immediately above the pipe 1 (in other words, the amount of the concrete outgoing from the pipe 1 is the same as that of the concrete incoming into the pipe 1), as shown in FIG. 3 through FIG. 5. Thus, the apparatus 10 does not allow any concrete portion fed from the hopper 3 to immediately slide down through the steel pipe portions and to outgo through the lower end outlet opening.

Accordingly, when the chute is filled with the concrete material 6 during normal operation, the incoming concrete portion 7 of the preset amount fed from the hopper 3 slides downward while causing the flexible tubes 2 to preform the aforesaid valve-like actions and causing the steel pipes 1 to effect the aforesaid downward transmittal of the volume, as shown in FIG. 4. As the aforesaid transmittal of the volume reaches the lower end outlet opening of the chute, an outgoing concrete portion 8 leaves the chute, and the volume of the portion 8 is the same as the preset volume of the incoming concrete portion 7.

Consequently, if the feeding of the concrete material is effected intermittently while causing the chute to steadily fulfil the aforesaid actions, the concrete material repeats the slide downs and stops in the chute until discharged from the lower end opening of the chute, as shown in FIG. 5.

Therefore, the dropping speed and the dropping impact of the concrete material are greatly reduced, and the concrete material gradually slides down in the chute so that separation of the ingredients of the concrete material is completely eliminated. Besides, the dropping speed and the dropping impact of the concrete material can be controlled at will by properly selecting the amount of each incoming portion and the intervals of the intermittent concrete feeding.

As described in the foregoing, with the method and apparatus of the downward transfer of concrete according to the present invention, the concrete can be safely and efficiently placed across a high head while maintaining the desired quality of the concrete material under severe conditions, such as very high heads or steep inclinations.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed as new and intended to be covered by Letters Patent of the United States:

1. A method of transporting and passing concrete through a high head including a plurality of rigid pipes, at least one flexible collapsible tube, a hopper of wet concrete material, and an airtight valve, which comprises:
    forming an airtight chute by fixing said rigid pipes along a path for transporting concrete such that said chute extends from a feeding level at the top of said high head to a discharge level near the bottom of said high head;
    airtightly connecting said at least one flexible tube between adjacent rigid pipes in said chute;
    airtightly connecting said hopper to said airtight valve;
    airtightly connecting said airtight valve to the top of said chute at said feeding level such that said airtight valve is positioned between said hopper and said chute;
    intermittently feeding discrete portions of wet concrete material from said hopper to said chute through said valve;
    airtightly closing the top of said chute by said valve immediately after feeding each of said discrete portions of the concrete material to said chute; and
    generating a negative pressure in said chute after passage of each of said discrete portions of the concrete material so that said tube is flattened between adjacent rigid pipes, thereby controlling the rate of descent of the concrete portions and maintaining the coherency of each portion.

2. A method as set forth in claim 1, which further comprises extending the chute at an angle relative to the vertical.

3. An apparatus for transporting and placing concrete through a high head, comprising:
    a plurality of fixed rigid pipes joined to form an airtight chute extending from a feeding level at the top of said high head to a discharge level near the bottom of said high head;
    at least one flexible collapsible tube airtightly connected between adjacent rigid pipes in said chute;
    a hopper of wet concrete material airtightly connected to the top of said chute;
    an airtight valve inserted between said hopper and said chute, said valve further comprising:
        means for controlling the passage of said concrete material from said hopper to said chute so as to intermittently feed discrete portions of the concrete material into said chute, and
        means for airtightly closing the top of said chute immediately after feeding each of said discrete portions of the concrete material so that said tube flattens between adjacent rigid pipes after passage of each discrete portion of the concrete material, and for controlling the rate of descent of the concrete portions so as to maintain the coherency of each of said portions.

4. An apparatus as set forth in claim 3, wherein said chute extends at an angle relative to the vertical.

5. An apparatus as set forth in claim 3, said airtight chute further comprising a plurality of steel pipes connected in series with said flexible tubes inserted alternately between adjacent steel pipes.

6. An apparatus as set forth in claim 5 which further comprises a plurality of ring-shaped couplers secured to opposite ends of each pipe and each flexible tube wherein said couplers of the steel pipe are airtightly connected to the couplers of the flexible tube.

7. An apparatus as set forth in claim 3, wherein said flexible collapsible tube further comprises a rubber tube.

8. An apparatus as set forth in claim 3, wherein said flexible collapsible tube further comprises a synthetic resin tube.

9. An apparatus as set forth in claim 3, wherein the ratio of the total length of said rigid pipes to the total length of said flexible tubes is between 20:1 and 3:1.

10. An apparatus as set forth in claim 3, wherein said hopper further comprises a control panel for controlling said valve.

* * * * *